United States Patent
Fu et al.

(10) Patent No.: US 10,728,503 B1
(45) Date of Patent: Jul. 28, 2020

(54) OBLONG CAMERA LENS COVER

(71) Applicant: Kuna Systems Corporation, San Bruno, CA (US)

(72) Inventors: Sai-Wai Fu, Los Altos Hills, CA (US); Harold G. Sampson, Sunnyvale, CA (US)

(73) Assignee: KUNA SYSTEMS CORPORATION, San Bruno, CA (US)

( * ) Notice: Subject to any disclaimer, the term of this patent is extended or adjusted under 35 U.S.C. 154(b) by 0 days.

(21) Appl. No.: 16/250,242

(22) Filed: Jan. 17, 2019

Related U.S. Application Data (63) Continuation of application No. 16/143,853, filed on Sep. 27, 2018, now Pat. No. 10,389,983, which is a continuation of application No. 16/111,669, filed on Aug. 24, 2018, now Pat. No. 10,389,982.

(60) Provisional application No. 62/789,113, filed on Jan. 7, 2019, provisional application No. 62/661,341, filed on Apr. 23, 2018.

(51) Int. Cl.
| | |
|---|---|
| *H04N 7/18* | (2006.01) |
| *H04N 7/08* | (2006.01) |
| *G08B 3/10* | (2006.01) |
| *H04N 7/14* | (2006.01) |

(52) U.S. Cl.
CPC .............. *H04N 7/181* (2013.01); *G08B 3/10* (2013.01); *H04N 7/0806* (2013.01); *H04N 7/142* (2013.01)

(58) Field of Classification Search
None
See application file for complete search history.

(56) References Cited

U.S. PATENT DOCUMENTS

| | | | |
|---|---|---|---|
| 6,832,043 B2 * | 12/2004 | Dirisio | G02B 7/04 396/535 |
| 2009/0147127 A1 | 6/2009 | Ogawa et al. | 348/374 |
| 2015/0022620 A1* | 1/2015 | Siminoff | H04M 11/025 348/14.02 |

OTHER PUBLICATIONS https://www.researchgate.net/figure/Field-of-view-The-quadrilateral-pyramid-extending-along-the-optical-axis-to-infinity_fig4_273394629.

\* cited by examiner

*Primary Examiner* — Christopher G Findley
(74) *Attorney, Agent, or Firm* — Christopher P. Maiorana, PC (57) ABSTRACT

An apparatus includes a capture device and a lens opening. The capture device may be configured to capture video data of an environment near the apparatus. The video data may have a diagonal field of view that causes a wide angle lens distortion effect. The lens opening may be configured in an oblong shape to match the diagonal field of view of the capture device. The oblong shape may have a larger width than height and prevents a vignette effect. The lens opening may be non-removable.

20 Claims, 8 Drawing Sheets

OBLONG CAMERA LENS COVER

This application relates to U.S. Ser. No. 16/143,853, filed Sep. 27, 2018, which relates to U.S. Ser. No. 16/111,669, filed Aug. 24, 2018, which relates to U.S. Provisional Application No. 62/661,341, filed Apr. 23, 2018. This application also relates to U.S. Provisional Application No. 62/789,113, filed Jan. 7, 2019. This application also relates to U.S. Ser. No. 15/899,007, filed Sep. 19, 2018. This application also relates to U.S. Ser. No. 15/611,975, filed Jun. 2, 2017, now U.S. Pat. No. 10,117,309. Each of the mentioned applications are incorporated by reference in their entirety.

FIELD OF THE INVENTION

The invention relates to image capture generally and, more particularly, to a method and/or apparatus for implementing an oblong camera lens cover.

BACKGROUND

Cameras are often included as part of a multi-functional device. As electronics are reduced in size, more components can fit in a smaller device footprint. Cameras, however, have physical limitations for capturing images. The size of electronics are constrained by the physical limitations of the camera. To capture images, the image sensor has to be able to receive light. For wide angle images, a large opening is needed to capture the wide angle field of view.

Current devices use circular lens openings to allow the image sensor to receive light to match the shape of the lens. To receive light for a wide angle field of view, current devices use two alternative options. One option is to have a large circular lens opening to receive all the light for the wide angle field of view. However, a circular lens opening that is large enough for a wide angle field of view also occupies a large vertical space. Occupying a large vertical space imposes limitations on the size of the device. Another option is to have a small circular lens opening. A small circular lens opening can be used to accommodate size constraints of the device. However, a small circular lens opening sacrifices image quality. If the circular opening is not large enough to accommodate the wide angle lens distortion, then captured images will have a vignette problem. Each option involves a trade-off between image quality and size constraints.

It would be desirable to implement an oblong camera lens cover.

SUMMARY

The invention concerns an apparatus comprising a capture device and a lens opening. The capture device may be configured to capture video data of an environment near the apparatus. The video data may have a diagonal field of view that causes a wide angle lens distortion effect. The lens opening may be configured in an oblong shape to match the diagonal field of view of the capture device. The oblong shape may have a larger width than height and prevents a vignette effect. The lens opening may be non-removable.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing an oblong camera lens cover that may (i) prevent a vignette effect, (ii) accept incoming light for a wide-angle image sensor, (iii) accept the same amount of light for a wide-angle image sensor as a circular lens opening, (iv) limit an amount of horizontal space occupied on a camera device, (v) be implemented for a home security device, (vi) match a diagonal field of view of a capture device and/or (vii) be implemented as one or more features of a device.

Figure 1:
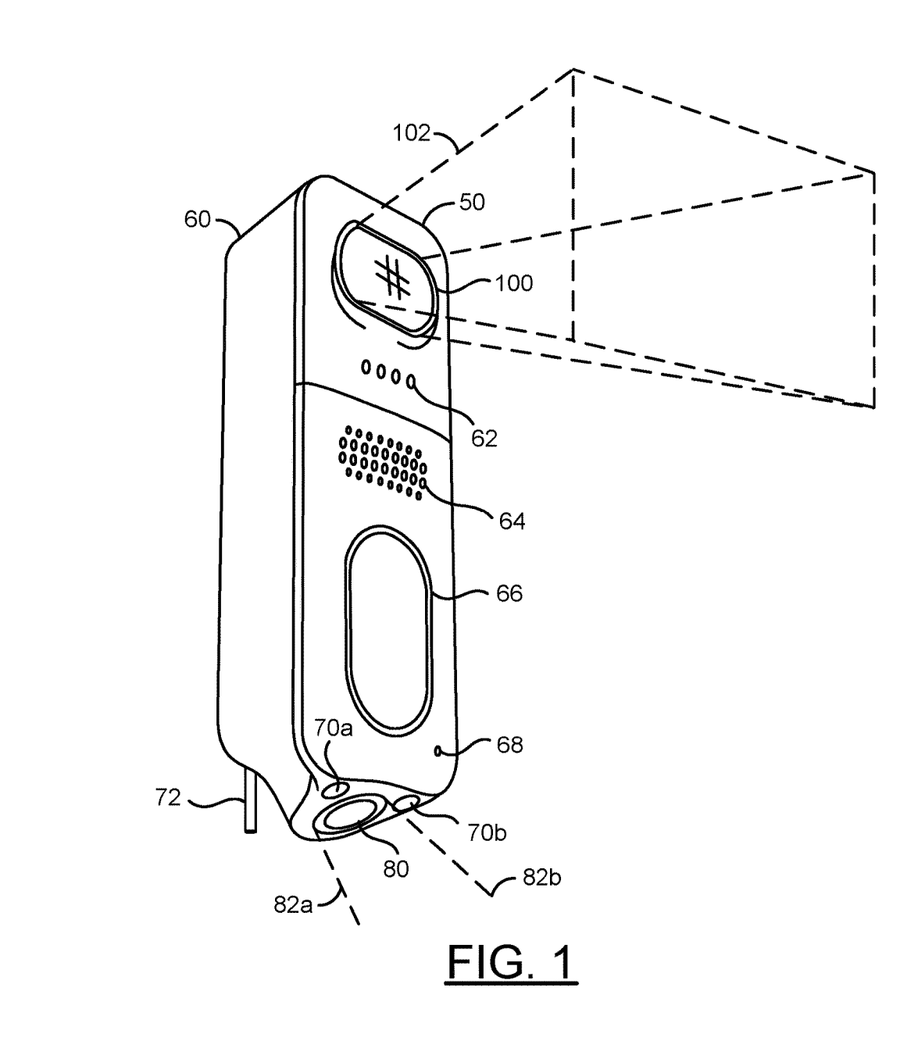
FIG. 1 is a diagram illustrating an example embodiment of the present invention implemented on a device.

Referring to FIG. 1, a diagram illustrating an example embodiment of the present invention implemented on a device is shown. A device 50 is shown. The device 50 may be a multi-functional device that comprises at least a video/image recording function. The device 50 may be configured as a security camera. In the example shown, the device 50 may be a smart security doorbell camera (e.g., configured to generate video recordings of visitors approaching and/or entering a premises). In another example, the device 50 may be implemented as a smart security light. In some embodiments, the device 50 may be implemented as an outdoor security device (e.g., a doorbell security camera mounted to the outside of the home). In some embodiments, the device 50 may be implemented as an indoor security device. The implementation and/or the functionality of the device 50 may be varied according to the design criteria of a particular implementation.

The device 50 may comprise a housing 60. The housing 60 may be configured to encase various components of the device 50 (e.g., electronics configured to implement and/or facilitate the implementation of features). The housing 60 may be molded together and/or snapped together to form a single enclosure. In some embodiments, the housing 60 may be non-removable. The housing 60 may comprise various openings to enable and/or facilitate functionality of the device 50 (e.g., openings for speakers, microphones, cables, camera lenses, etc.).

In the example shown, the device 50 may comprise various components. The device 50 is shown comprising a component 62, a component 64, a component 66, a component 68, components 70a-70b, a component 72, a component 80 and/or an apparatus 100. The components 62-80 and/or the apparatus 100 may enable the various functionality and/or features for the device 50. In the example shown, the component 62 may implement status lights and/or a microphone grille, the component 64 may implement a speaker grille, the component 66 may implement a button (e.g., a doorbell), the component 68 may implement a status light, the components 70a-70n may implement lights (e.g., for illumination and/or infrared lighting), the component 72 may implement a power cable and/or the component 80 may implement a lens. In one example, the speaker grille 64 may facilitate an audio playback feature by allowing sound waves generated by a speaker component within the housing 60 to easily pass through the housing 60 (e.g., provide good sound quality). In another example, the button 66 may enable a doorbell feature by providing a contact that activates the doorbell. The number, type, design, layout and/or functionality of the components 60-80 and/or the apparatus 100 may be varied according to the design criteria of a particular implementation.

The apparatus 100 may implement a camera lens opening. The apparatus 100 is shown having an oblong shape. For example, the oblong shape of the apparatus 100 may have a larger width dimension than height dimension. The lens opening 100 may be configured to accept light for a capture device (e.g., a camera sensor). The lens opening 100 may be configured to provide protection for an internal component of the device 50 (e.g., the capture device). In an example, a lens (e.g., a wide-angle lens) and an image sensor may be located behind the lens opening 100.

Dotted lines 102 are shown extending from the lens opening 100. The dotted lines 102 may represent a capture area (e.g., field of view) for the capture device located behind the lens opening 100. In the example shown, the field of view 102 may be a truncated rectangular pyramid. The shape of the field of view 102 may generally match the shape of the lens opening 100 (e.g., the width of the field of view 102 may be greater than the height of the field of view 102). Similarly, dotted lines 82a-82b are shown extending from the lens 80. The dotted lines 82a-82b may represent a capture area (e.g., field of view) for a capture device located behind the lens 80. In the example shown, the lens 80 may have a circular shape. In the example shown, the device 50 may implement a dual-camera security device configured to capture two separate capture areas (e.g., provide two different views).

Figure 2:
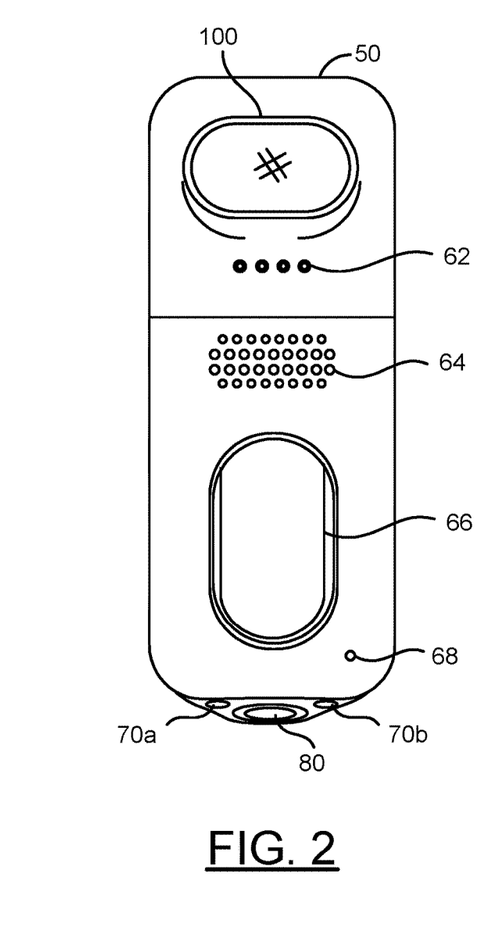
FIG. 2 is a diagram illustrating an alternate view of a device with an example embodiment of the present invention.

Referring to FIG. 2, a diagram illustrating an alternate view of the device 50 with an example embodiment of the present invention is shown. A front view of the device 50 is shown. The front view of the device 50 may show the microphone grille 62, the speaker grille 64, the button 66, the status light 68, the lights 70a-70b, the lens 80 and/or the lens opening 100.

The apparatus 100 is shown having the oblong shape. The apparatus 100 may be horizontally centered on the device 50. In some embodiments, the apparatus 100 may be implemented having a tilt. The tilt of the apparatus 100 may be configured to accommodate an angle of the image sensor of the capture device within the device 50. In one example, the apparatus 100 may have a 5 degree tilt (e.g., upwards) to capture a view with a different capture area than the capture area of the lens 80 (e.g., so that video data captured may provide a view of faces of visitors). For example, the device 50 may enable capturing a head-to-toe image of a person using a combination of the view captured using the lens opening 100 and the lens 80.

The device 50 may be implemented having a thin profile. For example, the device 50 may be relatively tall compared to the width. The thin profile of the device 50 may impose size and/or space restrictions for the components 60-80 and/or the apparatus 100. One example of the functionality of the device 50 may be implemented by the capture device located behind the lens opening 100. For example, the capture device may be a wide angle camera. In some embodiments, the device 50 may be implemented as a video doorbell. Implementing the device 50 with a thin profile may restrict the amount of room (e.g., the device 50 may not provide enough space for adding a clear glass cover over the entire device). In an example, the device 50 may be configured to implement the functionality of an outdoor camera and the lens opening 100 may be configured to minimize a "green house effect" of clear lens cover with minimal air trapped by the lens cover.

The lens opening 100 may have a relatively small height compared to width (e.g., an oblong shape). The oblong shape of the lens opening 100 may reduce a size footprint of the lens opening 100 on the front face of the device 50. A small height for the lens opening 100 may enable more components (e.g., which allows for greater functionality) to fit on the front face of the device 50. If the lens opening 100 had a larger height, the larger height may occupy more space that could be used for other components.

In the example shown, the shape of the lens opening 100 may have rounded corners. In some embodiments, the shape of the lens opening 100 may have edged corners (e.g., rectangular corners that meet at a 90 degree angle). In some embodiments, the shape of the lens opening 100 may have a combination of rounded and edged corners. The shape of the corners may be cosmetic. The lens opening 100 may have a width dimension greater than a height dimension.

Figure 3:
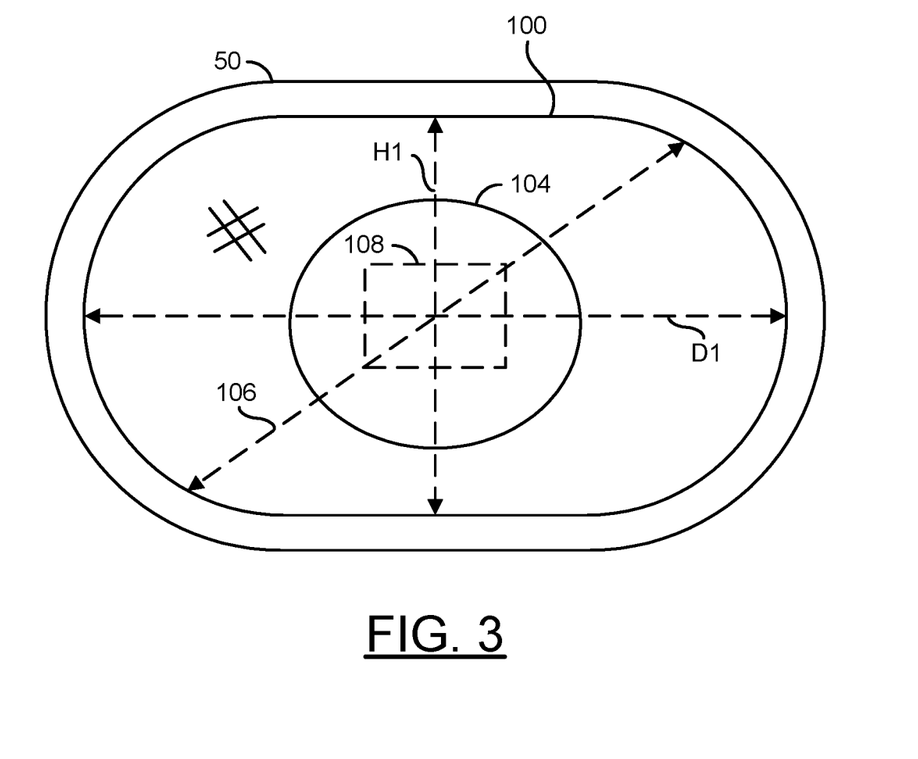
FIG. 3 is a diagram illustrating an example embodiment of the present invention.

Referring to FIG. 3, a diagram illustrating an example embodiment of the present invention is shown. A portion of the device 50 is shown. The portion of the device 50 shown may comprise the lens opening 100.

A lens 104 is shown. In one example, the lens 104 may be a wide angle lens. A dotted line 106 is shown. The dotted line 106 may represent a diagonal measurement of the lens opening 100. A block (or circuit) 108 is shown. The circuit 108 may implement an image sensor and/or capture device. In an example, the image sensor 108 may be rectangular with a 16:9 aspect ratio. The image sensor 108 may receive light within the truncated rectangular pyramid field of view 102. In some embodiments, the image plane sensor 108 may be a 16:9 horizontal:vertical ratio rectangle and the ideal field of view (without distortion) may be a truncated rectangular pyramid as shown in the field of view 102 in association with FIG. 1.

The wide angle lens 104 may be located behind the lens opening 100. The image sensor 108 may be located behind the wide angle lens 104. For example, both the wide angle lens 104 and the image sensor 108 may be located within the housing 60 of the device 50. The wide angle lens 104 may cause a wide angle distortion of images captured by the image sensor 108. Other components (not shown) may be located behind the lens opening 100. The number and/or type of components located behind the lens opening 100 may be varied according to the design criteria of a particular implementation.

The image sensor 108 may be configured to receive light from the environment. The image sensor 108 may be configured to convert the captured light into computer readable data (e.g., pixels that comprise video frames). The image sensor 108 may be implemented to record video data. The lens opening 100 may be configured to allow light from the environment to enter the housing 60 of the device 50 and to be detected by the image sensor 108. The wide angle lens 104 may be configured to focus the light onto the image sensor 108. The shape of the wide angle lens 104 may distort the received light to enable light from a wider field of view to hit the image sensor 104 than a lens that does not cause the wide angle distortion. The lens opening 100 may provide enough of an opening for the image sensor 108 to receive the light, while allowing the housing 60 to protect the wide angle lens 104, the image sensor 108 and/or other internal components of the device 50.

In some embodiments, the lens opening 100 may be configured to protect the wide angle lens 104 and/or the image sensor 108. The lens opening 100 may comprise a protective material. The protective material of the lens opening 100 may be configured to block objects from making contact with the wide angle lens 104 and/or the image sensor 108 without blocking light incoming to the image sensor 108. For example, the protective material may be transparent or translucent.

A dotted line H1 and a dotted line D1 are shown. The dotted line H1 and the dotted line D1 are shown extending across a center of the lens opening 100. The dotted line H1 may represent a vertical (e.g., height) dimension of the lens opening 100 at a largest height of the lens opening 100. The dotted line D1 may represent a horizontal (e.g., width) dimension of the lens opening 100 at a largest width of the lens opening 100. The height H1 may be smaller than the width D1. The larger horizontal dimension D1 than the vertical dimension H1 may comprise the oblong shape of the lens opening 100.

The wide angle lens 104 may result in the image sensor 108 capturing a diagonal field of view that may cause captured video frames to have a wide angle lens distortion effect. The oblong shape of the lens opening 100 may be configured to match the diagonal field of view of the images captured by the image sensor 108 with the distortion caused by the wide angle lens 104. For example, the diagonal measurement 106 of the lens opening 100 may be configured to match the diagonal field of view of the wide angle lens 104. The diagonal measurement 106 may match the diagonal field of view of the wide angle lens 104 because if the diagonal measurement 106 is larger than the diagonal field of view then the lens opening 100 may occupy too much physical space. The diagonal measurement 106 may match the diagonal field of view of the wide angle lens 104 because if the diagonal measurement 106 is smaller than the diagonal field of view then the lens opening 100 may result in the vignette effect problem.

Figure 4:
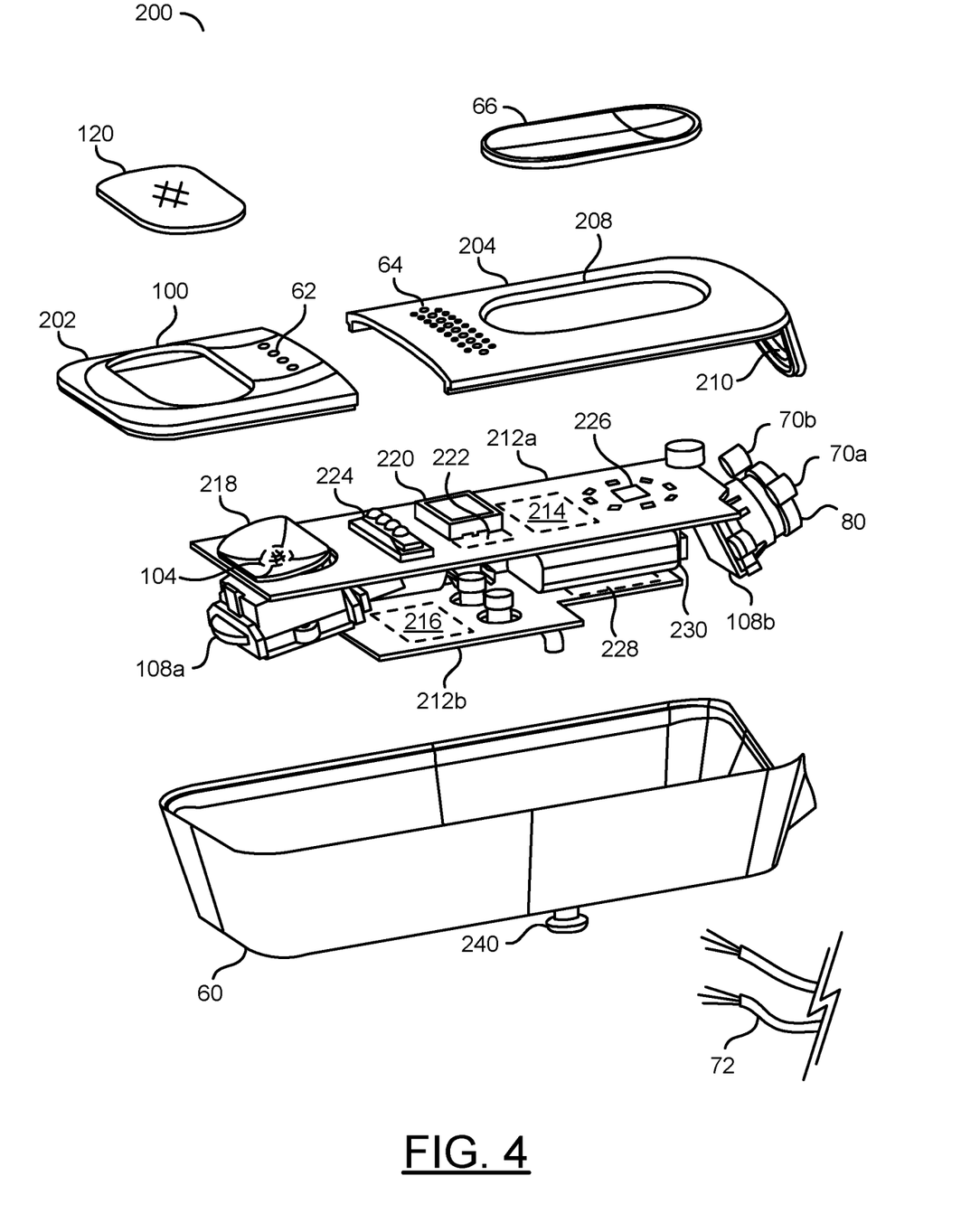
FIG. 4 is a diagram illustrating an exploded view of a device.

Referring to FIG. 4, a diagram illustrating an exploded view 200 of the device 50 is shown. The exploded view 200 may illustrate various components internal to the device 50. The internal components of the device 50 may provide the various functionality and/or implement various features of the device 50.

The housing 60 is shown. In the example shown, the housing 60 is hollow. The hollow housing 60 may be configured to provide a protective enclosure for the components of the device 50. The enclosure 60 is shown separated. An upper faceplate 202 and a lower faceplate 204 are shown. The upper faceplate 202 and the lower faceplate 204 may provide a front face of the housing 60. Together, the upper faceplate 204, the lower faceplate 204 and the housing 60 may provide the protective and/or decorative enclosure for the internal components of the device 50. The upper faceplate 202 and/or the lower faceplate 204 may implement a body plate for the device 50. The upper faceplate 202 and/or the lower faceplate 204 may provide a front cover for the housing 60. In the exploded view 200, the upper faceplate 202, the lower faceplate 204 and the housing 60 are shown as separated (e.g., for illustrative purposes). However, the upper faceplate 202, the lower faceplate 204 and the housing 60 may form a single enclosure for the device 50. In some embodiments, the upper faceplate 202, the lower faceplate 204 and the housing 60 may snap together. In some embodiments, the upper faceplate 202, the lower faceplate 204 and the housing 60 may be molded together, fused together and/or permanently adhered together. In one example, the upper faceplate 202 may be non-removable.

The upper faceplate 202 may comprise the microphone grille 62 and/or the lens opening 100. The lower faceplate 204 may comprise the speaker grille 64, an opening 208 and an opening 210. The microphone grille 62 and/or the lens opening 100 may be implemented as an integrated portion of the upper faceplate 202. For example, the lens opening 100 may not be removed from the upper faceplate 202. The speaker grille 64, the opening 208 and/or the opening 210 may be implemented as an integrated portion of the lower faceplate 204.

Generally, the lens opening 100 may not be removable from the upper faceplate 202 and/or the housing 60. An object 120 is shown. The object 120 may be a protective cover for the lens opening 100. The cover 120 may have a size and shape that matches the size and shape of the lens opening 100 (e.g., a width may be greater than the height). The cover 120 may be implemented as a clear material (e.g., to provide protection while still allowing light to reach the image sensor 108). In one example, the clear material of the cover 120 may be implemented as a piece of glass. In another example, the cover 120 may be implemented as a piece of clear plastic. The cover 120 may not provide a removable, opaque shutter. The implementation of the cover 120 may be varied according to the design criteria of a particular implementation.

The opening 208 may provide a space for the button 66 to fit into the opening 208. For example, when the button 66 is pressed, the opening 208 may allow the button 66 to move into the housing 60 to make contact with a component of the device 50. The opening 210 may provide a space for the lights 70a-70b and/or the lens 80.

Various components of the device 50 are shown in the exploded view 200. Circuits 212a-212b are shown. The circuits 212a-212b may provide interconnections and/or mounting locations for the various components of the device 50. The various components of the device 50 may fit within a limited amount of vertical space of the housing 60. A block (or circuit) 214 is shown implemented on the circuit 212a. The circuit 214 may implement a processor. For example, the circuit 214 may be a video processing device configured generate video data from the image sensor 108. A block (or circuit) 216 is shown implemented on the circuit 212b. The circuit 212b may implement a wireless communication device. The wireless communication device may enable the device 50 to transmit and/or receive data wirelessly. Image sensors 108a-108b may be implemented on the circuit 212a. The image sensors 108a-108b may have a similar implementation as the image sensor 104 described in association with FIG. 3. A lens 104 is shown with the image sensor 108a. The lens 104 may be configured to focus incoming light onto the image sensor 108a. In an example, the lens 104, the image sensor 108a and/or other circuits may implement a capture device.

A lens housing 218 is shown. The lens housing 218 may be a housing for the front wide angle lens 104. The front lens housing 218 may be implementing as larger than the front lens aperture. The cover 120 may fit over top of the lens housing 218 and the lens 104 may be behind the cover 120. The lens housing 218 may isolate the wide angle lens 104 from other components of the device 50.

The circuit 212a may further comprise a block (or circuit) 220, a block (or circuit) 222, a block (or circuit) 224 and/or a block (or circuit) 226. The circuit 220 may implement a speaker. The circuit 222 may implement an audio processor. The circuit 224 may implement a microphone. The circuit 226 may implement a fingerprint scanner. The circuit 212b may further comprise a block (or circuit) 228 and/or a block (or circuit) 230. The circuit 228 may implement storage (e.g., memory). The circuit 230 may implement a power storage/power conversion (e.g., a battery, an AC power converter, voltage regulation, etc.). A connector 240 is shown attached to the housing 60. The power cable(s) 72 may provide power via the connector 240. For example, the connector 240 may connect to the power storage/power conversion device 230 to provide an external power supply. In some embodiments, the power connectors may be a USB power connection. In the example shown, the connector 240 may be a T-Terminal (e.g., with the wires 72) connection. In an example, for a doorbell style security device 50, the T-Terminal connection may be implemented (e.g., most doorbells use a T-Terminal connection). The circuits 108a-108b may comprise other components (not shown). The components 214-230 may be implemented on either of the circuits 212a-212b (e.g., based on physical space constraints, heating constraints, operating condition constraints, etc.). The number, type and/or arrangement of the components 214-230 may be varied according to the design criteria of a particular implementation.

The circuits 212a-212b and/or the components 214-230 may be entirely and/or partially enclosed within the housing 60 (and the upper faceplate 202 and the lower faceplate 204). The components 214-230 may provide the functionality of the device 50. In some embodiments, the components 214-230 may implement the functionality for a smart security camera. In one example, the speaker 220 and the audio processing device 222 may be configured to generate audio for communicating to a visitor and the microphone 224 may be configured to receive audio (e.g., to enable 2-way communication). In another example, the fingerprint scanner 226 may be configured to identify a visitor that presses the button 66 based on a fingerprint. Details of the functionality of the circuits 212a-212b and/or the various components 214-230 may be described in U.S. patent application Ser. No. 16/143,853, filed on Sep. 27, 2018, appropriate portion of which are hereby incorporated by reference in their entirety.

The size of the opening 100 may affect the number of components 214-230 that may be implemented by the device 50. For example, the hollow housing 60 may have a limited amount of space. To provide functionality, the components 214-230 may need to fit within the constraints of the hollow housing 60. If the size of the opening 100 takes up too much space, one or more of the components 214-230 may be unable to fit within the constraints of the hollow housing 60.

Figure 5:
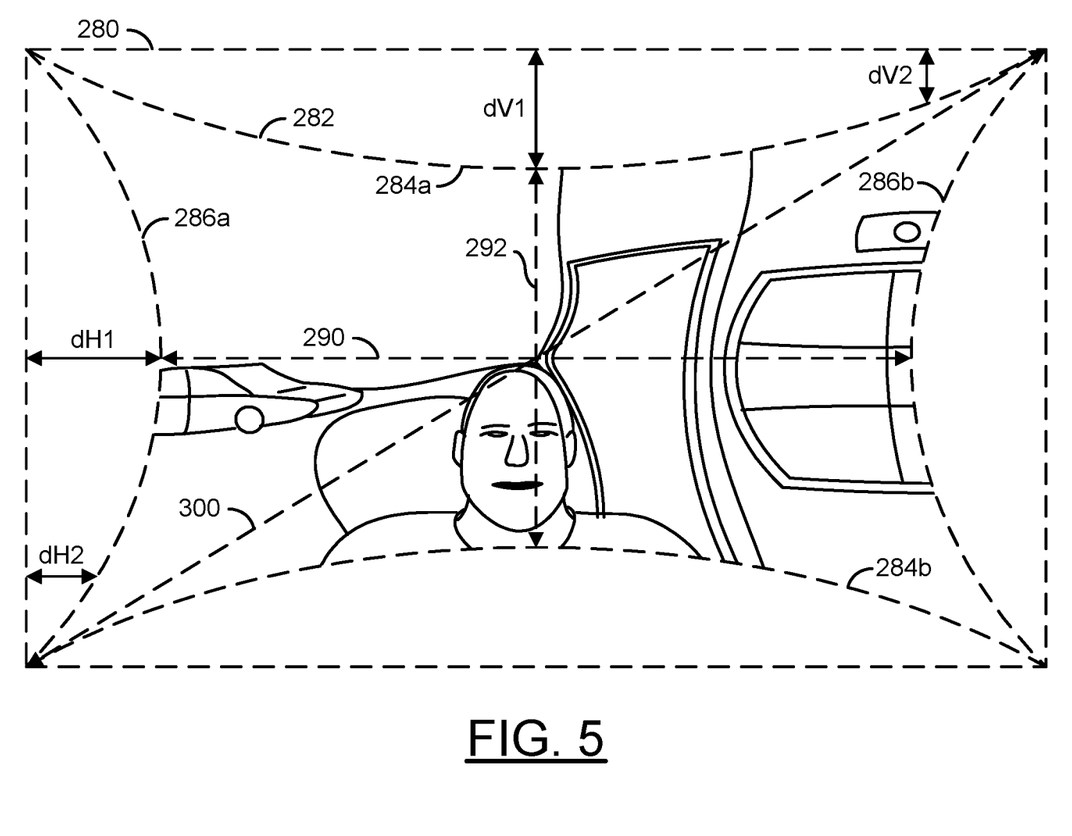
FIG. 5 is a diagram illustrating a distorted field of view captured by an image sensor.

Referring to FIG. 5, a diagram illustrating a distorted field of view captured by the image sensor 108 is shown. A dotted box 280 is shown. The dotted box 280 may represent a reference rectangle shape of a video frame captured by a lens without a lens distortion effect caused by the wide angle lens 104.

A shape 282 is shown within the box 280. The shape 282 may represent an actual field of view (FOV) for a video frame captured using the high quality wide angle lens 104. Using the wide angle lens 104 may enable the image sensor 108 to capture a wide angle field of view. However, the wide angle lens 104 may cause a wide angle lens distortion effect on the video data captured by the image sensor 108.

In the distorted video frame 282, various objects shown may be highly distorted as a result of the wide angle lens distortion (e.g., objects appear stretched towards a center of the video frame 282). For example, the wide angle lens distortion may cause a pincushion effect. In some embodiments, the processor 214 may be configured to remove the distortion effects caused by the wide angle lens 104 for the output video frames.

A top edge 284a and a bottom edge 284b are shown. A left edge 286a and a right edge 286b are shown. The edges 284a-284b and/or 286a-286b may be curved. The curved edges 284a-284b and/or 286a-286b may represent an amount of distortion caused by the wide angle lens effect. For the top edge 284a and the bottom edge 284b, the amount of distortion may change from the horizontal center of the video frame 282 to the right or left edges of the video frame 282. Similarly, for the left edge 286a and the right edge 286b, the amount of distortion may change from the vertical center of the video frame 282 to the top or bottom edges of the video frame 282.

A dotted line 290 and a dotted line 292 are shown. The dotted line 290 may represent a horizontal length of the video frame 282 at the vertical center of the video frame 282 (e.g., across the center of the video data). For example, the dotted line 290 may be a horizontal field of view of the video frame 282. The video frame 282 is shown extending to the corners of the reference box 280. For example, the top and the bottom of the video frame 282 may be horizontally longer than the dotted line 290. The dotted line 292 may represent a vertical length of the video frame 282 at the horizontal center of the video frame 282 (e.g., across the center of the video data). For example, the dotted line 292 may be a vertical field of view of the video frame 282. For example, the left and the right of the video frame 282 may be vertically longer than the dotted line 292.

A distance dV1 is shown. The distance dV1 may be a vertical distance from the top edge 284a of the video frame 282 to the reference box 280 at the same location of the top edge 284a where the vertical length 292 is shown. A distance dV2 is shown. The distance dV2 may be a vertical distance from the top edge 284a of the video frame 282 to the reference box 280 measured near the right edge 286b of the video frame 282. The distance dV1 is shown larger than the distance dV2. For example, the video frame 282 may have a variable vertical FOV (e.g., the vertical FOV view may be larger near the center of the video frame 282 than towards the edges).

A distance dH1 is shown. The distance dH1 may be a horizontal distance from the left edge 286a of the video frame 282 to the reference box 280 at the same location of the left edge 286a where the horizontal length 290 is shown. A distance dH2 is shown. The distance dH2 may be a horizontal distance from the left edge 286a of the video frame 282 to the reference box 280 measured near the bottom edge 284b of the video frame 282. The distance dH1 is shown larger than the distance dH2. For example, the video frame 282 may have a variable horizontal FOV (e.g., the horizontal FOV view may be larger near the center of the video frame 282 than towards the edges).

A dotted line 300 is shown. The dotted line 300 may represent a diagonal field of view of the distorted video frame 282. Generally, for an equirectangular video frame, the diagonal field of view 300 may be expected to have a length according to the Pythagorean Theorem (e.g., $D^2=H^2+W^2$). For example, the diagonal field of view 300 may have a length that corresponds to the length and width of the reference rectangle 280. However, due to the wide angle lens distortion of the video frame 282, which causes a shorter horizontal FOV 290 and a shorter vertical FOV (e.g., compared to the length and width of the undistorted reference rectangle 280), the diagonal field of view 300 may not be calculated using the Pythagorean Theorem with the horizontal field of view 290 length value and the vertical field of view 292 length value. For example, the length of the diagonal field of view 300 squared may be larger than a sum of the horizontal field of view 290 squared and the length of the vertical field of view 292 squared. The larger diagonal field of view 300 may create a difficult vignette problem. Matching the oblong shape of the lens opening 100 to the diagonal field of view 300 may remedy the vignette problem.

Figure 6:
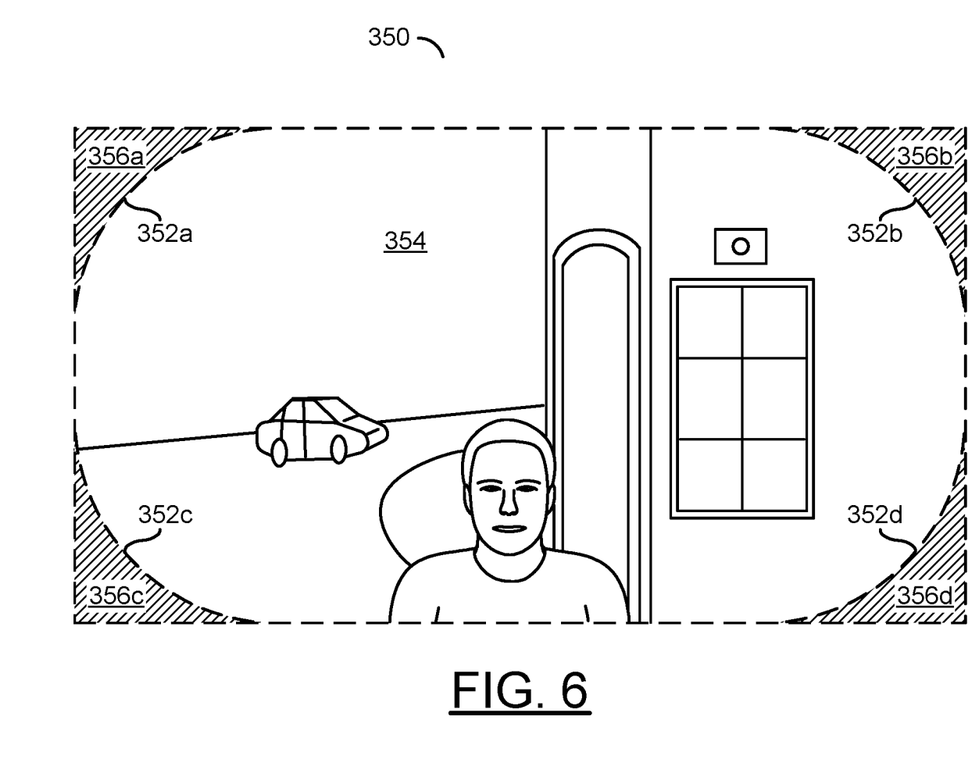
FIG. 6 is a diagram illustrating a vignette effect in a video frame.

Referring to FIG. 6, a diagram illustrating a vignette effect in a video frame is shown. An example video frame 350 is shown. In an example, the video frame 350 may be a corrected (e.g., de-warped) version of the distorted video frame 282 shown in association with FIG. 5. The video frame 350 may be an example of the vignette problem. The vignette problem may be caused by the wide angle lens effect of the wide angle lens 104. In one example, the wide angle lens 104 may be have a 160 degree field of view.

The video frame 350 is shown having curved corners 352a-352d. The video frame 250 may comprise a visible area 354 and dark areas 356a-356d. The dark areas 356a-356d are shown in the corners of the video frame 350 outside of the curved corners 352a-352d. The visible area 354 and the dark areas 356a-356d may be video data captured by the image sensor 108. For example, both the visible area 354 and the dark areas 356a-356d may be part of the video data (e.g., the dark areas 356a-356d may not be areas of the video frame 350 that have been cropped out by video operations of the processor 214).

The visible area 354 may be a portion of the video frame 350 where the image sensor 108 has received incoming light. The dark areas 356a-356d may be portions of the video frame 350 where the image sensor 108 has not received incoming light. The dark areas 356a-356d may be undesirable (e.g., portions of a video frame with no visible video content). The dark areas 356a-356d may be the vignette effect. The vignette effect may be a reduction of image quality of the captured video data.

The vignette effect (e.g., the dark areas 356a-356d) may be caused when the lens opening 100 does not match the diagonal field of view 300 of the capture device (e.g., the wide angle lens 104 and the image sensor 108). For example, if the lens opening 100 is too small, the vignette effect occurs. The lens opening 100 may be configured to match the diagonal distance 106 to the diagonal field of view 300 of the capture device to prevent the vignette effect. For example, the oblong shape of the lens opening 100 may prevent the vignette effect without reducing an image quality of the video data (e.g., the dark areas 356a-356d may not exist and the visible area 354 may cover the entire video frame 350). The lens opening 100 may eliminate the dark areas 356a-356d and the visible area 354 may be the entire video frame 350.

Figure 7:
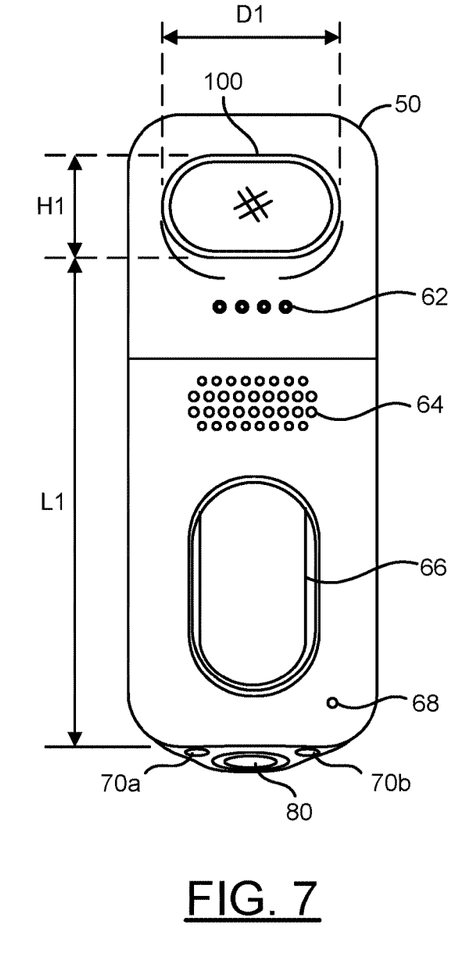
FIG. 7 is a diagram illustrating a size of a lens opening according to an embodiment of the present invention on a device.

Referring to FIG. 7, a diagram illustrating a size of the lens opening 100 according to an embodiment of the present invention on the device 50 is shown. A front view of the device 50 is shown. The device 50 may comprise the lens opening 100, the microphone grille 62, the speaker grille 64, the button 66, the status light 68, the lights 70a-70b and/or the lens 80.

A length L1 is shown. The length L1 may be a measurement from the bottom of the device 50 to the bottom of the lens opening 100. The length H1 is shown. The length H1 may be the height of the lens opening 100. The length D1 is shown. The length D1 may be the width of the lens opening 100. The height H1 of the lens opening 100 may be smaller than the width D1 of the lens opening 100.

The oblong shape of the lens opening 100 may be a solution to the vignette effect problem. The oblong shape of the lens opening 100 may be configured to match the actual diagonal FOV 300 of the wide angle lens 104 and/or the image sensor 108. By matching diagonal distance 106 to correspond to the actual diagonal FOV 300, the oblong shape of the lens opening 100 may be wide enough to receive enough of the incoming light to prevent the vignette effect and restrain the surface area of the lens opening 100. In particular, the oblong shape 100 may restrain (or minimize) the height H1 of the lens opening 100. Keeping the height H1 of the lens opening 100 constrained may provide free space for other functions of the device 50 (e.g., IRED, speakers, etc.). For example, minimizing the surface area of the lens cover 100 may enable the length L1 to be large enough for the components 214-230. While the components 214-230 may be small (or made smaller as technology advances), the functionality of one or more of the components 214-230 may have physical constraints (e.g., a size of the button 66 may need to be a particular size for a person to press comfortably).

In the example shown, the lens opening 100 may be an oval lens cover. The lens opening 100 may not be a removable hood. The lens opening 100 may comprise a diagonal distance 106 long enough to prevent the vignette effect (e.g., match the diagonal FOV 300). Constraining the height H1 may provide more workable space for the device 50. In the example shown, the height H1 may enable the length L1 to be long enough to provide space for the microphone grille 62, the speaker 64, the button 66 and the status light 68 on the front face of the device 50. For example, the area of the lens opening 100 may be dead space that could be used for other functionality. The height H1 may reduce an amount of dead space.

Figure 8:
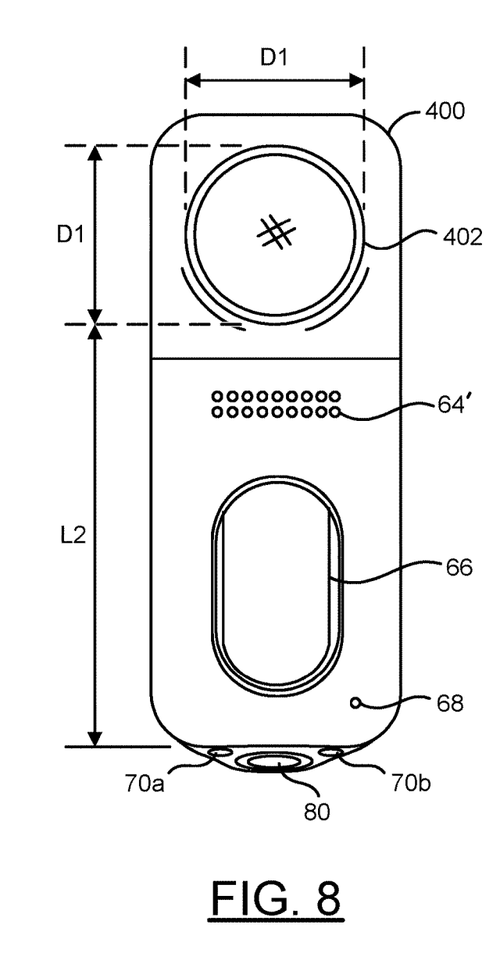
FIG. 8 is a diagram illustrating a size of a circular lens opening on a device.

Referring to FIG. 8, a diagram illustrating a size of a circular lens opening on a device is shown. A device 400 is shown. The device 400 may have a same height and width as the device 50. The device 400 may have a similar implementation to the device 50. However, the device 400 may implement a large circular lens opening 402 instead of the oblong lens opening 100. The device 400 may comprise the large circular lens opening 402, the speaker grille 64', the button 66, the status light 68, the lights 70a-70b and/or the lens 80.

A length L2 is shown. The length L2 may be a measurement from the bottom of the device 400 to the bottom of the large circular lens opening 402. A length D1 is shown. The length D1 may be the height of the large circular lens opening 402. Since the large circular lens opening 402 may be a circular shape, the length D1 may also be the width of the large circular lens opening 402 (e.g., the length D1 may be the diameter of the large circular lens opening 402). The diameter D1 of the large circular lens opening 402 may be same length as the width D1 of the lens opening 100 shown in association with FIG. 7.

The large circular shape of the lens opening 402 may be a solution to the vignette problem. The large circular shape of the lens opening 402 may be wide enough to receive enough of the incoming light to prevent the vignette effect. However, to solve this vignette problem, the large circular lens opening 402 becomes too big. For example, the large circular lens opening 402 may not restrain the amount of vertical space taken up by the large circular lens opening 402. For example, the height D1 of the large circular lens opening 402 may be larger than the height H1 of the oblong lens opening 100 shown in association with FIG. 7.

In the example shown, the round lens opening 402 may have a diameter (e.g., D1 value) of 27 mm and be implemented with a 10 degree tilt. The height H1 of the oblong lens opening 100 may be smaller than the height D1 of the round lens opening 402 by 30%-40%. For example, the length L1 shown in association with FIG. 7 may be longer than the length L2. For example, approximately 8 mm of height may be saved by implementing the lens opening 100 compared to the round lens opening implementation 402. A reduced length L2 may not provide enough free space for other features of the device 400 (e.g., IRED, speaker, etc.). In the example shown, the device 400 may not have enough space to implement the microphone grille 62. Furthermore, the speaker grille 64' is shown having two fewer rows of openings compared to the speaker grille 64 shown on the device 50. Implementing the large circular lens opening 402 may result in less functionality and/or a reduction of quality of the implemented functionality (e.g., the speaker grille 64' may cause a lower sound quality than using the large speaker grille 64). For example, implementing the large circular lens shape 402 may prevent the vignette effect, but have a trade-off of less free space which results in reduced functionality under similar size constraints (e.g., the area of the large circular lens 402 may have more dead space than the lens opening 100.

Figure 9:
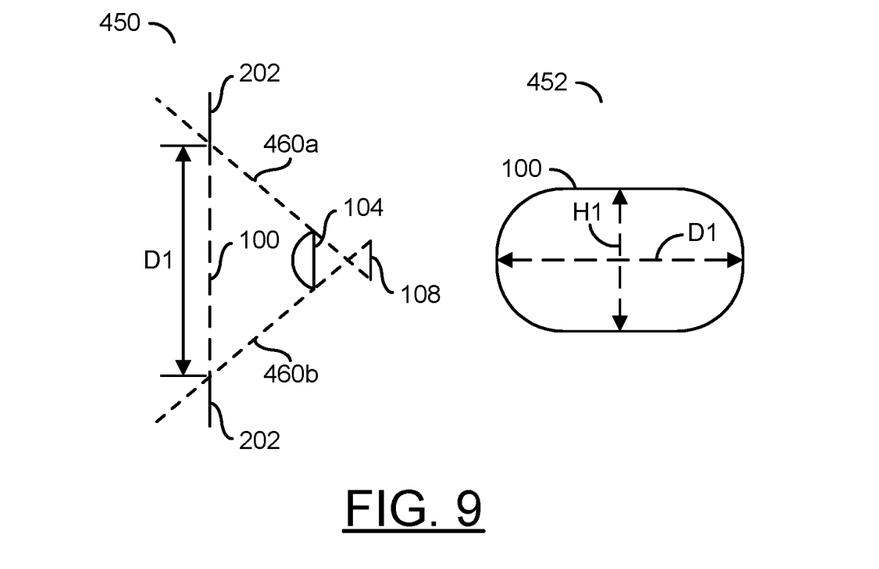
FIG. 9 is a diagram illustrating an image sensor receiving light through a lens opening according to an embodiment of the present invention.

Referring to FIG. 9, a diagram illustrating the image sensor 108 receiving light through the lens opening 100 according to an embodiment of the present invention is shown. A top down view 450 of the lens opening 100 is shown. A straight on view 452 of the lens opening 100 is shown.

The top down view 450 may comprise the lens opening 100, the wide angle lens 104 and the sensor 108. The width D1 of the lens opening 100 is shown. Portions of the upper faceplate 202 are shown on either side of the lens opening 100. For example, the portions of the upper faceplate 202 may be opaque (e.g., block incoming light).

Dotted lines 460a-460b are shown. The dotted lines 460a-460b may represent incoming light to the sensor 108. The dotted lines 460a-460b are shown angled. The dotted lines 460a-460b are shown inverted by the wide angle lens 104 before reaching the image sensor 108. Light rays may be inverted in the wide angle lens 104, then hit the image sensor 108. The wide angle lens 104 alone may cause the distortion effect. Generally, a lens element with non-zero thickness may have a similar ray travel length variation induced distortion unless carefully compensated by other lens elements. The Brown-Conrady model may mathematically describe the distortion. The angle of the dotted lines 460a-460b may represent the field of view of the sensor 108 (e.g., the amount of light for preventing the vignette effect).

For example, if any light between the lines 460a-460b is blocked, then the vignette effect may occur. The distance D1 of the lens opening 100 may allow all of the light 460a-460b to reach the image sensor 108 (e.g., the dotted lines 460a-460b is shown reaching the edges of the sensor 108 and covering the entire surface of the image sensor 108). For example, the lens opening 100 may eliminate the vignette effect with no sacrifice in image quality.

The straight on view 452 may show the height H1 and the width D1 of the lens opening 100. The width D1 in the straight on view 452 may correspond with the width D1 in the top down view 450. The height H1 may be smaller than the width D1. The smaller height H1 may enable the device 50 to have more free space. The lens opening 100 may meet the physical constraints of the capture device (e.g., eliminate the vignette effect) and the size constraints of the device 50 (e.g., a small height).

Figure 10:
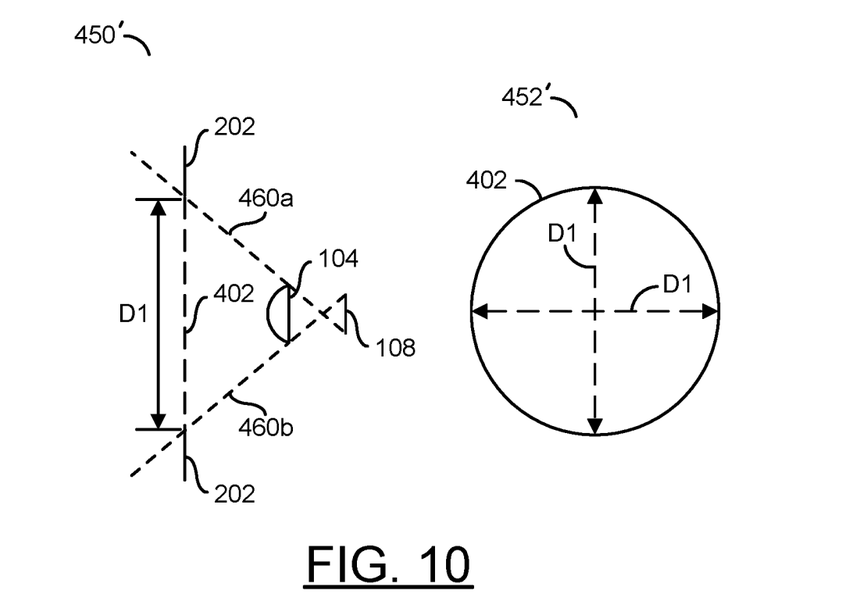
FIG. 10 is a diagram illustrating an image sensor receiving light through a large circular lens opening.

Referring to FIG. 10, a diagram illustrating the image sensor 108 receiving light through the large circular lens opening 402 is shown. A top down view 450' of the large circular lens opening 402 is shown. A straight on view 452' of the large circular lens opening 402 is shown.

The top down view 450' may comprise the large circular lens opening 402, the wide angle lens 104 and the sensor 108. The width D1 of the large circular lens opening 402 is shown. Portions of the upper faceplate 202 are shown on either side of the large circular lens opening 402. For example, the portions of the upper faceplate 202 may be opaque (e.g., block incoming light).

Dotted lines 460a-460b are shown. The dotted lines 460a-460b may represent incoming light to the sensor 108. The dotted lines 460a-460b are shown angled. The dotted lines 460a-460b are shown inverted by the wide angle lens 104 before reaching the image sensor 108. The angle of the dotted lines 460a-460b may represent the field of view of the sensor 108 (e.g., the amount of light for preventing the vignette effect). For example, if any light between the lines 460a-460b is blocked, then the vignette effect may occur. The distance D1 of the large circular lens opening 402 may allow all of the light 460a-460b to reach the image sensor 108. The dotted lines 460a-460b are shown reaching the edges (e.g., covering the full surface) of the image sensor 108. For example, the large circular lens opening 402 may eliminate the vignette effect.

The straight on view 452' may show the height D1 and the width D1 of the large circular lens opening 402. The width D1 in the straight on view 452' may correspond with the width D1 in the top down view 450'. The height D1 may be the same size as the width D1. For example, the large circular lens opening 402 may be a circle having the diameter D1. The width D1 may enable the large circular lens opening 402 to prevent the vignette effect. However, the larger height D1 restricts the amount of vertical space available for the device 400. The larger height D1 may reduce the functionality and/or number of features available for the device 400. The width D1 of the large circular lens opening 402 may be the same width D1 as the lens opening 100. For example, the lens opening 100 may enable the image sensor 108 to receive the same amount of light (e.g., between the dotted lines 460a-460b) as using the large circular lens opening 402 having the diameter D1 equal to the width D1 of the lens opening 100. The diagonal length of the large circular lens opening 402 may not match the diagonal field of view 300 (e.g., too large). The large circular lens opening may meet the physical constraints for the capture device (e.g., no vignette effect), but not meet the size constraints for the device 50 (e.g., too much horizontal space is occupied).

Figure 11:
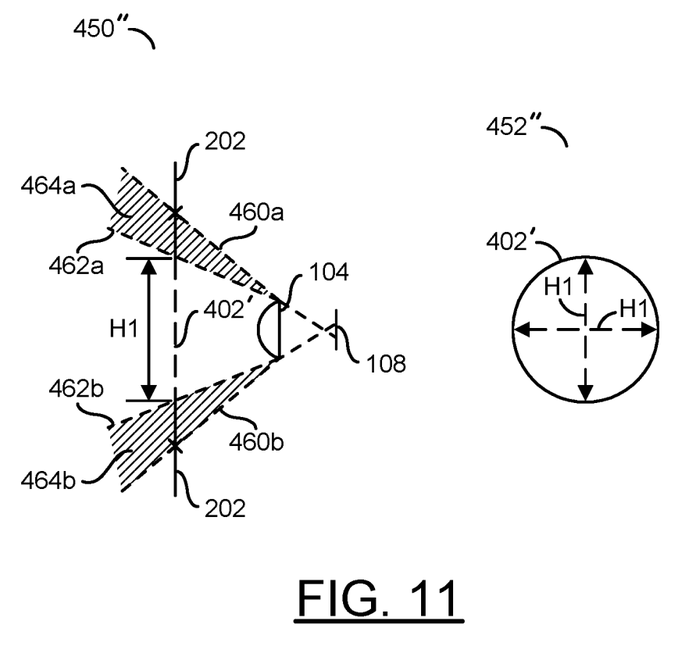
FIG. 11 is a diagram illustrating a small circular lens opening blocking light.

Referring to FIG. 11, a diagram illustrating a small circular lens opening 402' blocking light is shown. A top down view 450" of the small lens opening 402' is shown. A straight on view 452" of the small lens opening 402' is shown.

The top down view 450" may comprise the small circular lens opening 402', the wide angle lens 104 and the sensor 108. The width H1 of the small circular lens opening 402' is shown. For example, the small circular lens opening 402' may be a circular lens opening having a smaller diameter than the large circular lens opening 402 shown in association with FIG. 10. Portions of the upper faceplate 202 are shown on either side of the small circular lens opening 402'. For example, the portions of the upper faceplate 202 may be opaque (e.g., block incoming light). Since the width H1 of the small circular lens opening 402' is smaller than the width D1 of the lens opening 100 and/or the small circular lens opening 402, more of the upper faceplate 202 is shown on either side of the small circular lens opening 402' than is shown in association with FIG. 9 and FIG. 10.

Dotted lines 460a-460b are shown. The dotted lines 460a-460b may represent incoming light to the sensor 108. The dotted lines 460a-460b are shown angled. The angle of the dotted lines 460a-460b may represent the field of view of the sensor 108 (e.g., the amount of light for preventing the vignette effect). For example, if any light between the lines 460a-460b is blocked, then the vignette effect may occur. An X is shown to represent that the dotted lines 460a-460b have been stopped by the upper faceplate 202 and not able to reach the image sensor 108 (e.g., the dotted lines 460a-460b have been extended to the wide angle lens 104 for illustrative purposes). The distance H1 of the small circular lens opening 402' may not allow the light 460a-460b to reach the image sensor 108.

Dotted lines 462a-462b are shown. The dotted lines 462a-462b may represent incoming light to the sensor 108. The dotted lines 462a-462b are shown angled. The dotted lines 462a-462b are shown inverted by the wide angle lens 104 before reaching the image sensor 108. The angle of the dotted lines 462a-462b may represent the field of view allowed by the small circular lens opening 402' with a width of H1. For example, the small circular lens opening 402' may allow light between the lines 462a-462b to reach the image sensor 108. For example, the dotted lines 462a-462b are shown reaching the image sensor 108, but not reaching to the edges of the image sensor 108.

Shaded areas 464a-464b are shown. The shaded area 464a is shown between the dotted line 460a and the dotted line 462a. The shaded area 464b is shown between the dotted line 460b and the dotted line 462b. The shaded areas 464a-464b may represent incoming light that is blocked from reaching the image sensor 108. For example, the shaded areas 464a-464b may be light that would be allowed if there is an opening of the width D1. By using the smaller circular lens opening 402' some of the incoming light may be blocked. Blocking the incoming light from reaching the image sensor 108 may cause the vignette effect. For example, using the small circular lens opening 402' may result in captured images and/or video data having the vignette effect 356a-356d.

The straight on view 452" may show the height H1 and the width H1 of the small circular lens opening 402'. The width H1 in the straight on view 452" may correspond with the width H1 in the top down view 450". The height H1 may be the same size as the width H1. For example, the small circular lens opening 402' may be a circle having the diameter H1. For example, the small circular lens opening 402' may have a diameter equal to the height H1 of the lens opening 100 shown in association with FIG. 9.

The smaller height H1 compared to the larger height D1 may provide more free vertical space available for the device 400. The smaller height H1 may enable the device 400 to have increased functionality and/or number of features available for the device 400. However, the width H1 may not enable the small circular lens opening 402' to prevent the vignette effect. For example, using the small circular lens opening 402' may cause the vignette effect. The small circular lens opening 402' may not meet the physical space constraints of the capture device, which results in the vignette effect.

The small circular lens opening 402' may result in more free space to implement greater functionality, but at a cost of having the captured images with the vignette effect. The large circular lens opening 402 may result in preventing the vignette effect, but at the cost of having less free space to implement functionality. Using a circular lens (e.g., either the large circular lens opening 402 or the small circular lens opening 402') may involve a trade-off between image quality (e.g., captured images having the vignette effect), and available functionality of the device. The oblong lens opening 100 may be implemented without a trade-off between image quality and device functionality. For example, the oblong lens opening 100 may prevent the vignette effect and provide free space to allow the device 50 to implement a greater amount of functionality.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a capture device configured to capture video data of an environment near said apparatus, wherein said video data has a diagonal field of view that causes a wide angle lens distortion effect; and
   a lens opening configured in an oblong shape to match said diagonal field of view of said capture device, wherein (i) said oblong shape (a) has a width and a height, (b) said width is larger than said height and (c) said lens opening is within a faceplate, (ii) said lens opening is non-removable, (iii) said width is wide enough to prevent a vignette effect, (iv) a surface area of said faceplate used by said lens opening and a microphone mounted to said faceplate is less than or equal to a surface area of a circle defined using said width as a diameter of said circle, (v) said apparatus has a shape of a video doorbell, and (vi) said apparatus is configured to be attached to a building near an entrance.

2. The apparatus according to claim 1, wherein said vignette effect covers corners of said video data.

3. The apparatus according to claim 1, wherein said apparatus is configured having a larger vertical dimension than a horizontal dimension.

4. The apparatus according to claim 1, wherein said wide angle lens distortion effect is a pincushion effect.

5. The apparatus according to claim 1, wherein said wide angle lens distortion effect causes (i) a horizontal field of view that varies from a top of a video frame to a bottom of said video frame and (ii) a vertical field of view that varies from a first side of said video frame to a second side of said video frame.

6. The apparatus according to claim 1, wherein (i) a length of a horizontal field of view is measured across a center of said video data, (ii) a length of a vertical field of view is measured across said center of said video data and (iii) a length said diagonal field of view squared is larger than a sum of said length of said horizontal field of view squared and said length of said vertical field of view squared.

7. The apparatus according to claim 1, wherein said vignette effect is prevented without reducing an image quality of said video data.

8. The apparatus according to claim 1, wherein said lens opening is implemented as an integrated portion of said faceplate.

9. The apparatus according to claim 8, wherein said faceplate is configured to provide a front cover for an enclosure for said capture device.

10. The apparatus according to claim 9, wherein said faceplate is further configured to enclose components that provide a functionality of a security camera.

11. The apparatus according to claim 8, wherein said lens opening is not removable from said faceplate.

12. The apparatus according to claim 1, wherein said lens opening is covered by a clear material configured within an enclosure containing said capture device.

13. The apparatus according to claim 1, wherein said oblong shape of said lens opening is configured to enable said capture device to receive a same amount of light as would be received using a circular opening having said diameter.

14. The apparatus according to claim 13, wherein said oblong shape has a smaller height than said circular opening.

15. The apparatus according to claim 14, wherein said smaller height enables said apparatus to have more free horizontal space to implement features.

16. The apparatus according to claim 15, wherein said apparatus has a thin profile that introduces size constraints for implementing said features.

17. The apparatus according to claim 15, wherein said features comprise at least one of capturing video frames, capturing audio, playing back sound, implementing a doorbell or providing a dual field of view.

18. The apparatus according to claim 1, wherein said lens opening is covered by a clear material that is configured to minimize air trapped by the lens cover.

19. An apparatus comprising:
a capture device mounted in an enclosure, said capture device configured to capture video data of an environment near said apparatus, wherein said video data has a diagonal field of view that causes a wide angle lens distortion effect; and
a lens opening in a front cover of said enclosure, said lens opening configured as an oblong shape to match said diagonal field of view of said capture device, wherein (i) said oblong shape (a) has a width and a height and (b) said width is larger than said height, (ii) said lens opening is non-removable, (iii) said width is (a) wide enough to prevent a vignette effect and (b) a surface area used by said lens opening and a microphone is less than or equal to a surface area of a circle defined using said width as a diameter of said circle, (iv) said apparatus has a shape of a video doorbell, and (v) said apparatus is configured to be attached to a house near an entrance.

20. The apparatus according to claim 19, wherein said height of said opening is short enough to allow additional components to be mounted in said enclosure.

* * * * *